United States Patent [19]

De Schamphelaere et al.

[11] Patent Number: 4,571,602

[45] Date of Patent: Feb. 18, 1986

[54] RECORDING APPARATUS

[75] Inventors: Lucien A. De Schamphelaere, Edegem; Freddy M. Librecht, Boechout; Willy F. Van Peteghem, Berchem; Etienne M. De Cock, Edegem, all of Belgium

[73] Assignee: AGFA-Gevaert, N.V., Mortsel, Belgium

[21] Appl. No.: 665,542

[22] Filed: Oct. 26, 1984

[30] Foreign Application Priority Data

Nov. 1, 1983 [BE] Belgium .............................. 83201562

[51] Int. Cl.⁴ ............................................. G01D 15/06
[52] U.S. Cl. .................................... 346/160; 346/154; 346/108; 364/519
[58] Field of Search ............... 346/154, 150, 160, 108, 346/76 PH, 76 L; 358/300; 400/119, 121, 124; 364/519

[56] References Cited

U.S. PATENT DOCUMENTS 4,258,373  3/1981  Arnoldi et al. ...................... 346/154
4,297,715  10/1981  Tadaachi et al. ................... 346/150
4,467,333  8/1984  Seimiza et al. ...................... 346/154

Primary Examiner—E. A. Goldberg
Assistant Examiner—A. Evans
Attorney, Agent, or Firm—A. W. Breiner

[57] ABSTRACT

In a recording apparatus comprising a recording head with a multiplicity of individually addressable and energizable point-like radiation sources arranged in staggered parallel rows for irradiating points across a moving photoreceptor, the driver circuits for the different rows of radiation sources are provided by identical chips. Each chip incorporates delay means capable of holding data-bit signals for a delay period before the signals are transmitted for energizing the associated radiation sources but is formed so that the delay means can be rendered inoperative by selecting one or other of different mode control voltage input points. The control chips for one row of the radiation sources are set in the delay-operative mode to compensate for the distance between the two rows of sources.

7 Claims, 6 Drawing Figures

RECORDING APPARATUS

BACKGROUND OF THE INVENTION

The present invention relates to a recording apparatus for line-wise recording information upon a moving photoreceptor.

Apparatus for recording information upon a moving photoreceptor are known comprising a multiplicity of stationary point-like radiation sources that are distributed along a recording head extending transversely of the direction of displacement of a photoreceptor, and that are individually energisable for information-wise exposing the photoreceptor in response to received information signals as the photoreceptor moves past the recording head. The movement of the photoreceptor may occur either continuously or stepwise.

The transfer of the images of the radiation sources onto the photoreceptor can be achieved by means of lens arrangements, fiber optics or fiber pipes, self-focussing fibers or the like. The radiation sources must be sufficiently small in order to achieve an acceptable image resolution and the spacing between the images of the radiation sources transferred to the photoreceptor must be small in order to give the visual impression of an uninterrupted transverse line on the photoreceptor.

It is considered in the art that at least 10 irradiated points per mm are required on the photoreceptor, so that for recording an information line across a standard DIN A4 photoreceptor, which has a width of 216 mm, a recording head comprising at least about 2200 discrete radiation sources in the form of LED's (light-emitting diodes) is required. A plurality of LED's can be formed as an array on a monolithic semi-conductor chip. By line-wise assembling a plurality of chips, a recording head having a length of 216 mm can be obtained.

It is usual for the recording head to comprise two parallel staggered rows of the radiation sources. In comparison with the use of a single row of radiation sources the spacing between adjacent sources of a row can in those circumstances be doubled while achieving the same image resolution. The illumination of the sources forming the more downstream row, reckoning in the direction of motion of the photoreceptor must be delayed relative to the illumination of the sources of the other row in order that the projected images of the different rows of sources shall be on a common transverse line across the photoreceptor.

Apparatus wherein such a delay occurs are disclosed e.g. in GB Application No. 2,042,746 A of Savin Corporation relating to a multiple variable light source photographic printer, and in EUR Application No. 82 201 314.9 of Agfa-Gevaert N. V. relating to a recording apparatus.

In such previously proposed apparatus the delay function is achieved by means of an integrated delay circuit which is wired to integrated driver circuits for the row of LED's whose energisation responsive to data-bit signals pertaining to a given information line has to be delayed relative to the energisation of the other row of LED's. The production of the necessary conductor wire connections is costly and the production complexity and production costs of the apparatus are further increased if serially connected memories and associated switch means for stepwise advancing signals through the memories are introduced for extending the delay period to more than a single information line period.

SUMMARY OF THE INVENTION

It is an object of the present invention to provide a recording apparatus having a said delay function, which is easier and less expensive to manufacture.

Recording apparatus according to the present invention is of a kind known per se, comprising a recording head with a multiplicity of individually addressable and energisable point-like radiation sources arranged in staggered parallel rows for irradiating points across a photoreceptor during movement thereof relative to and in a direction normal to said rows, and driver circuits for simultaneously energising the radiation sources of each row responsive to respective data bit input signals serially applied to said driver circuits during an information line period, there being delay means for delaying energisation of the radiation sources of a first said row relative to the energisation of the sources of a second said row thereby to compensate for the distance between such rows. The apparatus according to the invention is distinguished from the known apparatus of that kind by the following combination of characterising features:

- the driver circuits for the different rows of radiation sources are provided by identical chips each of which incorporates a shift register for serially reading-in data-bit signals, drivers for a plurality of the radiation sources and delay means located between said shift register and said drivers for holding data-bit signals transferred from said shift register for a dealy period before such signals are transmitted to said drivers;
- each said chip is formed so that it is capable of operating in different modes in one of which said delay means is operative and in another of which such delay means is inoperative and the mode in which it operates depends on which of different voltage input points (51,52) provided on the chip is selected for the reception of a mode control voltage;
- and only the chips providing the driver circuits for the radiation sources requiring delayed energisation are connected into voltage supply means so as to operate in a delay-operative mode.

In the manufacture of apparatus according to the invention the delicate wiring operations required in the prior art apparatus for connecting some of the driver circuits to extraneous delay circuits are avoided. The delay means are incorporated on the chips (hereafter called "control chips") as part of the integrated driver circuits. Moreover a considerable cost saving is achieved as a result of the adoption of a standard control chip design for both rows of radiation sources. It would be more costly to manufacture and use two designs of control chip, one with and the other without delay means, than to use chips of a standard design, incorporating delay means and a mode control facility permitting the delay means to be rendered inoperative.

A recording apparatus according to the invention may include more than two staggered rows of said point-like radiation sources. In such a case the control chips for the radiation sources in all but one of the rows will be set to operate in the delay-operative mode. The delays for said different rows are different, depending on the spacing of said rows from said one row that receives undelayed signals. For convenience reference is made hereafter only to two rows of radiation sources.

In general the use of only two rows of radiation sources suffices, and is preferred, and in such case the chips of the driver circuits will comprise only two voltage input points for the reception of a mode control voltage.

The requisite delay period between the energisation of the radiation sources of one row and the energisation of the radiation sources of the other row responsive to data-bit signals pertaining to the same information line depends on the distance between the corresponding rows of projected image points on the photoreceptor path and on the speed of the photoreceptor. The delay period may if desired correspond with two or more information line periods.

The radiation sources are preferably LED's.

Preferably each of the control chips comprises a serial-in/parallel-out shift register means, at least one parallel-transfer delay register, a parallel-transfer latch register, and drivers for the associated radiation sources.

It is advantageous for the control chips for the different rows of radiation sources to be fed with their data-bit information signals from the same end of the complete array of radiation sources formed by those rows. At the same time it is desirable for the control chips for each row of radiation sources to be located to that side of the array which is nearer that row. The fulfilment of both of these conditions requires each control chip to be capable of being fed with data-bit information signals at either end and to be capable of shifting such signals in one or the other direction along its shift register. In preferred recording apparatus according to the invention the control chips for each row of radiation sources are located on that side of the array of radiation sources which is nearer that row; each control chip has opposed end terminals via which the chip is connected into a data-bit signal transmission line; the chip is capable of effecting data-bit signal shift along its shift register in either direction depending on which of the voltage input points provided on the chip is selected for the reception of a shift direction control voltage; and the control chips for the radiation sources of the different rows are so connected (via their said end terminals and their said voltage input points) to data-bit signal feed lines and to voltage supply means that the supply of data-bit signals to all of the chips takes place from the same end of the total array of radiation sources and the shifting of all such signals occurs in the same direction along the array.

Preferably the control chips are so formed that their mode control voltage input points are the same as their shift direction control voltage input points. The selection of the delay-operative or the delay-inoperative mode then automatically sets the appropriate signal shift direction and vice versa.

Advantageously the total array of radiation sources is formed by the end-to-end assembly of a plurality of modules each carrying a group of the radiation sources and their associated control chips. This modular construction facilitates assembly of the recording head of the apparatus.

It is preferably for each of the modules of a said modular assembly to include, for each row of radiation sources, a connector assembly via which the control chips of that row are conductively connected to each other and to voltage supply lines. This has the advantage that if any replacement of a defective module by a good one is required at any time this can be done while leaving the fine wire connections to the other modules intact. It is also beneficial for each such connector assembly to be provided with means permitting ready adjustment of the current level to the radiation sources supplied via that connector assembly.

A particular apparatus according to the invention, selected by way of example, will now be described with reference to the accompanying drawings, wherein:

DESCRIPTION OF THE PREFERRED EMBODIMENT

Figure 1:
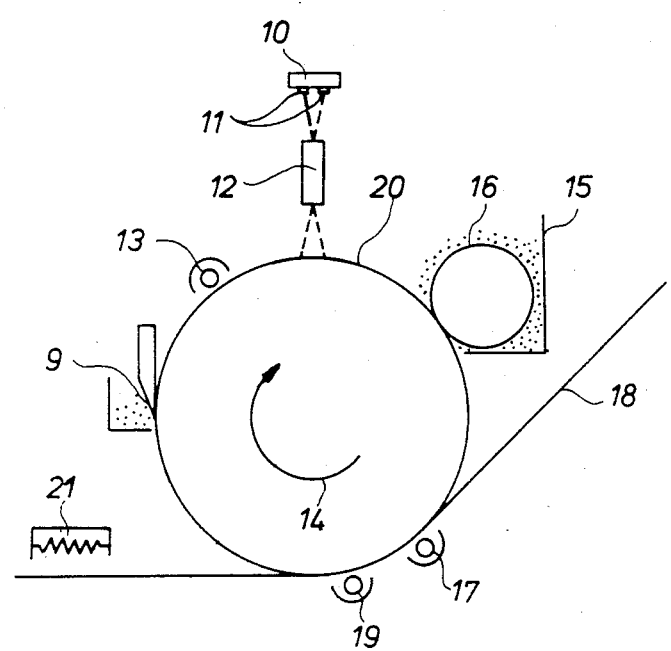
FIG. 1 is a diagrammatic view of a printing machine incorporating the apparatus.

The printing machine as shown in FIG. 1 comprises an exposure head 10 that is provided with a multiplicity of energizable pointlike radiation emitters such as 11, optical transfer means 12 for transferring the images of the emitters, and a photoreceptor in the form of a cylindrical surface of a drum 20. Known materials for the photoreceptor are doped selenium, polyvinyl carbazole, CdS, CdSe, SeTe, etc.

The operation of the machine may be as follows. A corona discharge station 13 electrically charges the surface of the drum 20, the sense of rotation of the drum being indicated by the arrow 14. The drum is driven by a motor (not shown). The areas of the drum surface that become exposed by the emitters become discharged whereas the other, unexposed areas maintain their charge. The electrostatic charge pattern thus produced is developed by a developing station 15 wherein a developer composition 16 is brought into contact with the charge pattern on the drum.

A corona transfer station 17 transfers the toner pattern from the drum surface onto a paper sheet 18 that is moved in contact with the drum. A corona separator station 19 is effective to separate the paper sheet from the drum. A fuser station 21 may fuse the toner pattern on the sheet so that a permanent copy is obtained. A cleaner station 9 may be operative to remove all the toner still remaining on the drum surface therefrom before a next exposure is made.

It will be understood that the photoreceptor could take some other form, e.g. the form of a belt for transferring the charge image to a suitable support, a photoconductive sheet on which the final image is formed and fixed. Such as photoconductive sheet may e.g. comprise a support coated with a light-sensitive layer such as ZnO, silver halide, etc.

Figure 2:
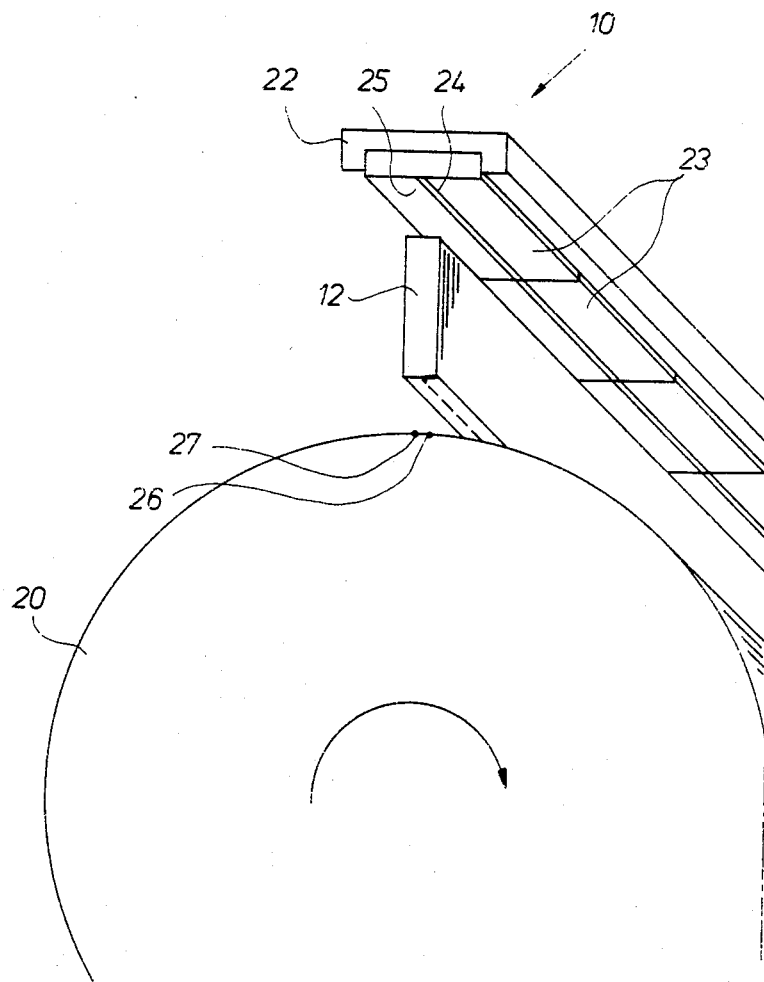
FIG. 2 is a diagrammatic isometric view of the recording head and the optical transfer means of the recording apparatus.

An isometric view of part of the exposure head 10 and the optical transfer means 12 is shown in FIG. 2. The exposure head comprises an elongate channel section bar 22 wherein a plurality of exposure modules 23 are mounted next to each other. Each module comprises several arrays of emitters as will be explained further. The emitters of all the modules are arranged in two parallel rows 24 and 25, that run parallel with the axis of the drum 20.

The optical transfer means 12 is an elongate element wherein a plurality of self-focussing fibers are provided, the optical axis of the transfer means, or more correctly the optical plane thereof, passing through the axis of the drum.

Due to the focussing power of the element 12, each of the rows of emitters will be imaged on a respective transverse line on the photoreceptor path, namely row 24 on line 26, and row 25 on line 27, the two lines being represented by dots in the figure.

Figure 3:
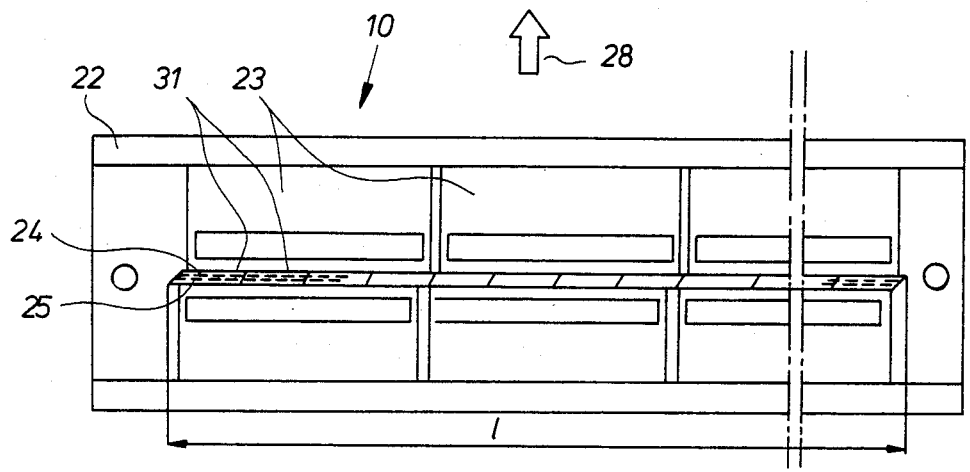
FIG. 3 is a diagrammatic plan view of the recording head.

A view of the exposure head 10, from the optical transfer means towards the head, is represented in FIG. 3. A plurality of modules 23 are mounted next to each other in the bar 22 so that the total exposure length 1 corresponds with the desired width of the image on the photoreceptor. The direction of movement of the photoreceptor past the exposure head is indicated by the arrow 28. The bar 22 is made of a metal whereby three important properties are united, namely a good heat conductivity, a good dimensional stability, and a good electric conductivity. The bar may optionally be provided with fins or the like for improving the heat transfer from the bar to the air. Suitable materials for the bar are e.g. brass, aluminium and copper. The modules 23 are suitably secured in the bar by means of an electrically conductive quickly curing epoxy adhesive. The mounting of the exposure head in the apparatus may be arranged in such a way that slight adjustments of the positioning of the head are possible, thereby to ensure a true parallel alignment of the emitter rows 24 and 25 with the photoreceptor surface.

Figure 4:
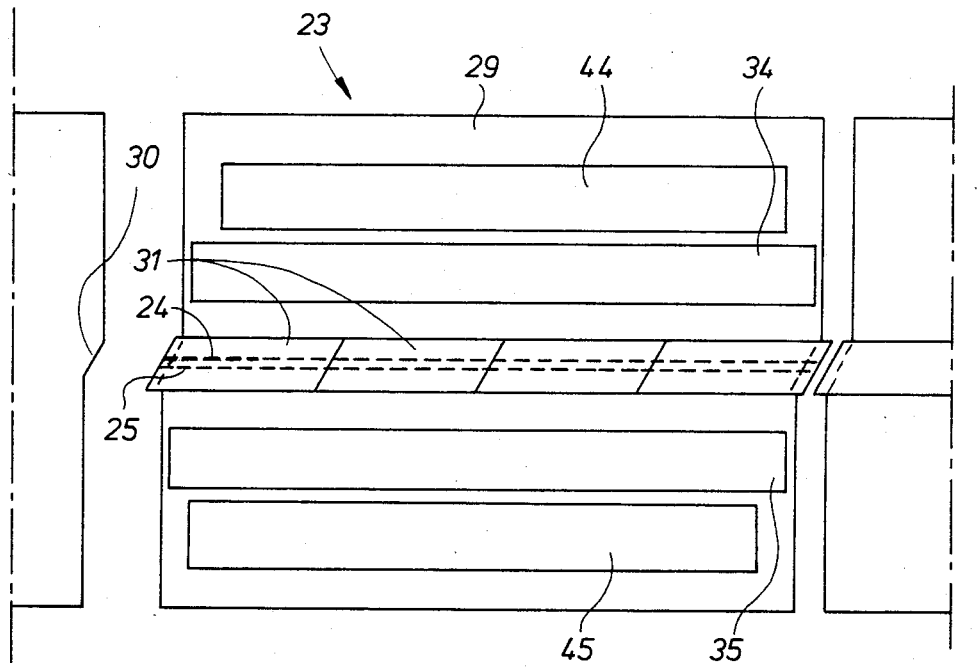
FIG. 4 illustrates diagrammatically the electronic circuitry of one half of one module of the recording head.

An enlarged view of one module 23 of the exposure head is illustrated in FIG. 4. The module 23 comprises a metal base plate 29 onto which four arrays 31 of emitters are mounted in abutting relationship. Each array has two rows 24 and 25 of emitters. Since in the further description, light emitting diodes will be considered for the emitters, the term LED's will hereinafter be used for these elements. The LED's are made on monocrystalline chips. The LED rows are staggered. The chips may as shown be cut with oblique end edges so that when chips are mounted in mutually abutting relationship as illustrated their LED's form two uninterrupted rows notwithstanding the close spacing between neighbouring LED's of each row (see European Patent Application No. 82 201 324.9). The modules are in their turn mounted close to each other in the bar 22 so that the slanting end edges of their end LED chips abut each other. In this way two uninterrupted rows of equally spaced LED's are obtained over the complete length of the recording head. The electrical connections to the base chip material of each LED, in the present example the cathodes of the LED's, are achieved via the bar 22 (FIG. 3).

The control means for the LED's are in the form of two integrated circuits 34 and 35, the circuit 34 controlling the even LED's, i.e. the LED's of row 24, and the circuit 35 controlling the odd LED's, i.e. those of row 25. The integrated circuits 34 and 35 are in the form of chips (herein called "control chips") that likewise may be adhered to the base plate 29. Each of the chips forming the control means has a length that covers the total LED array on one module. Each module includes a thick film structure 44 and 45 for performing the electrical connection of the circuits 34 and 35 into the apparatus.

It will be understood that the mounting of the LED chips and the control chips on the base plates to form the modules, and the mounting of the modules on the bar to produce the recording head, are carried out under a microscope in view of the minute dimensions of the components. A microscope is also needed for making the electrical connections between the control circuits and the LED's. The connection between each LED and a corresponding bonding output bonding pad of the control chip can be formed by a fine wire of aluminium that is applied by the wedge-wedge technique known in the art.

Figure 5:
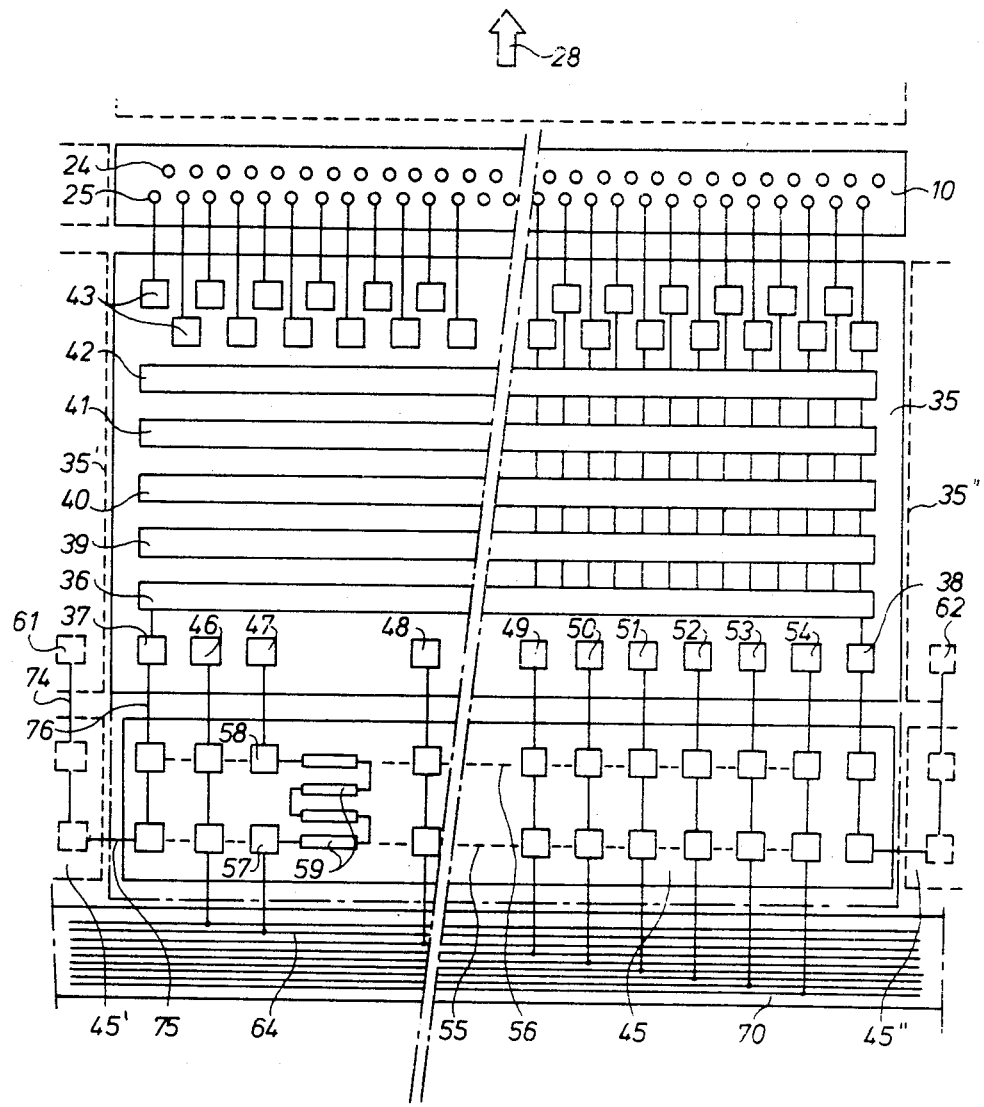
FIG. 5 illustrates diagrammatically the electronic circuitry of one half of one module of the recording head.

FIG. 5 illustrates in detail the electronic circuitry of one half of a module of the recording head.

Control chip 35 (control chips 34 being identic to chips 35) comprises a 64-steps serial-in/parallel-out shift register 36 with data-bit input terminals 37 and 38, two delay registers 39 and 40, a latch register 41, sixty four individual drivers (one for each LED in the associated LED row 25), represented by one rectangular block 42, and sixty four output bonding pads 43 for the LED's in said row 25. The bonding pads are arranged in two staggered rows thereby to provide for more spacing between them.

The control chip 35 comprises the following input bonding pads. The pads 37 and 38 forming the shift register input terminals referred to above, the pad 46 that receives a trigger signal for the control of the drivers 42, the pad 47 that receives the current-level control signal, the pad 48 for the clock signal that controls the serial signal shifting through the register 36, the pad 49 for the supply voltage of the drivers 42 and the LED's, the pad 50 for the supply voltage of the registers, the pads 51 and 52 for signal shift direction control voltages which control the direction of signal shift through the shift register 36 and which also control the operative or inoperative mode of the delay registers 39 and 40, the pad 53 that is for ground connection, and finally the pad 54 that is for a load control that controls the transfer of data bits from one register to the other.

Thick film connection structure 45 (the structure 44 is identical to 45), is made on a ceramic support that is fixed to the module 29.

The connection structure comprises a row 55 of input bonding pads and row 56 of output bonding pads, the lateral position of which corresponds with the position of the input bonding pads of the chip 35. The corresponding input and output bonding pads of the structure 45 are in direct connection with each other, except for the pads 57 and 58 which are connected to each other through four series resistors 59.

The input bonding pads are connected to a printed circuit strip 70 that extends over the complete length of the recording head and that has nine conductor paths that provide the required supply voltages and control signals for the corresponding lower half of all the modules. A similar conductor strip 60 (FIG. 6) is provided at the other side of the recording head for the connections of the control means of the upper halves of the module (see FIG. 6).

More details about the chip 35 and its operation are as follows. For the ease of explanation, it is assumed hereinafter that signal shifting in the shift register 36 of control chip 35, and in all other control chips 35', 35" etc. at the same side of the LED chips in FIG. 5, occurs from to the left to the right.

Bonding pad 37 forms the data-bit input terminal of the chip 35, and is connected to bonding pad 61, that constitutes the output shift register terminal of the foregoing chip 35'. The bonding occurs via the thick film structures 45' and 45, and the wire connections 74, 75 and 76. Signals received at 37 are stepwise shifted through the shift register 36 under the control of a clock signal applied at input 48. Once the register has stepped a number of times, e.g. sixty four times in the present example, the next stepping causes the first received signal to leave the register at output pad 38 and to enter the register of the next chip 35" at input pad 62. This next chip 35" is in connection with the chip 35'" next to it, etc.

The direction of signal shift through the register 36 depends on the selection of the input pad 51 or 52 for the reception of a D.C. setting voltage. The chip 35 is in fact connected into the operating circuitry of the recording head so that a D.C. voltage is applied at pad 52. Because of the internal design of the chip, the application of this D.C. voltage of pad 52 sets the chip for effecting the signal shift from left to right in response to the clock signal at 48 and at the same time renders the delay registers 39 and 40 inoperative.

The bonding pad 54 receives the "load" signals for instructing processing of the data signals in the shift register 36. A load signal, or in other words a "line" signal, causes the parallel transfer of all the data bits from register 36 towards the LED drivers 42. Because the delay registers 39 and 40 of chip 35 are rendered inoperative by its setting, the data bits received by the shift register 36 of chips 35 are transferred from that shift register directly to the latch register 41 on their chips. The drivers 42 for the odd LED's forming row 25 are directly connected to that latch register. However although the drivers 42 receive the relevant data bit signals from the latch register 41 during each line period in response to the "load" signal, those signals cannot be released to their respective LEDs until the drivers are activated by a "trigger" signal. This trigger signal which activates all of the drivers 42 for the odd LEDs is delivered at a moment which is determined by output signals from a photoreceptor speed monitor (not shown) and this moment is such as to preserve a predetermined uniform record line spacing on the photoreceptor notwithstanding any preceding fluctuation in the speed of the photoreceptor. This feature whereby the moment of energisation of LEDs is determined in function of photoreceptor speed fluctuations is described and claimed in the specification of co-pending European patent Application No. 83 201 561.4 filed on the 1st November 1983 and entitled "Recording Apparatus".

As already indicated, the chip 34, which in the aspect of FIGS. 4 and 5 is located above the LED arrays 31, is identical with chip 35. However, because chip 34 is inverted end for end relative to chips 35 and the data-bit input signals are supplied to both chips from the same end of the recording head (from the left in the aspect of FIGS. 4 and 5) it follows that in the case of chip 34, its bonding pad 38 serves as its data-bit input terminal and its bonding pad 37 serves as its data-bit output terminal. Therefore the chip 34 is connected into the operating circuitry so that the D.C. setting voltage is applied to its pad 51, thereby setting the chip so that the signal shift through its shift register 36 also takes place from left to right in the aspect of FIGS. 4 and 5 notwithstanding that the chip is inverted end for end relative to chip 35. The application of the setting voltage to the pad 51 of chip 34 renders its delay registers 39 and 40 operative. Consequently, the data-bit signals received by the shift register of chip 34 are not transferred directly from that register to the latch register 41 of that chip but are transferred step-wise, firstly to its delay register 39, then from that delay register to delay register 40 and then from that delay register to the latch register. Each of the transfer steps takes place responsive to a load signal on the bonding pad 54 above referred to. Each such load signal causes transfer of data bit signals from the shift register of chip 34 to its first delay register 39 simultaneously with the transfer of previously received data-bit signals from that delay register to the second delay register 40 and with the transfer of still earlier received data-bit signals from that second delay register to the latch register of the chip. And signals transferred to that latch register can drive the connected even LEDs responsive to those signals immediately their drivers are triggered by a trigger signal transmitted responsive to any photoreceptor speed fluctuations detected by a speed detector (not shown) in accordance with the invention described and claimed in the aforesaid European Patent Application No. 83 201 561.4, the timing of which trigger signal is such as to ensure that odd and even data-bit signals relating to the same information line are recorded in accurate transverse alignment on the photoreceptor. It will be noted that there is a delay corresponding to two line periods (plus or minus any correction necessary to compensate for any said photoreceptor speed fluctuation) between the energisation of the odd LEDs and the energisation of the even LEDs responsive to the data-bit signals pertaining to the same information line.

It will be understood that phase-shifted sub-clock signals are generated in the chips 34 and 35, which control the different registers so that emptying and reloading of the different registers occurs from the latch register to the shift register 36.

Finally, there is the input pad 47 onto which a current-level control signal is applied. This signal determines the mean current that is produced by a driver into its corresponding LED. Reference to the "mean" current is made because owing to fabrication tolerances of drivers and LED's, the actual current through a LED may be up to e.g. 10% larger or smaller than the desired nominal value. Setting of the control signal occurs by the short-circuiting of one or more of the four different series resistors 59. The resistor array enables fifteen different combinations to be made. The resultant control current signal is the quotient of the DC voltage, e.g. 5 V, on line 64 and the total series resistance. The actual current through the LED's is a number of times larger than the corresponding control current as a consequence of an amplification by a fixed factor set in the electronic circuitry of the chip 35. For instance, a control current of 500 uA, may produce a mean LED current of 3 mA.

The described technique of performing the connections of the control means of each module through an intermediary connection board, namely the thick film structures 45, has the advantage over the direct lateral connection of the moduli with each other, as disclosed for instance in the GB Appl. 8,205,024 already referred to, that if any replacement of a defective module by a good one is required at any tme this can be done while leaving the fine wire connections to the other modules intact.

The use in accordance with the present invention of chips 35 which as to their inherent construction are identical to chips 34 affords the important advantage of standardised manufacture. This more than compensates for the inclusion of delay registers even on chips (chips 34) which are used in such a way that those delay registers are superfluous.

Figure 6:
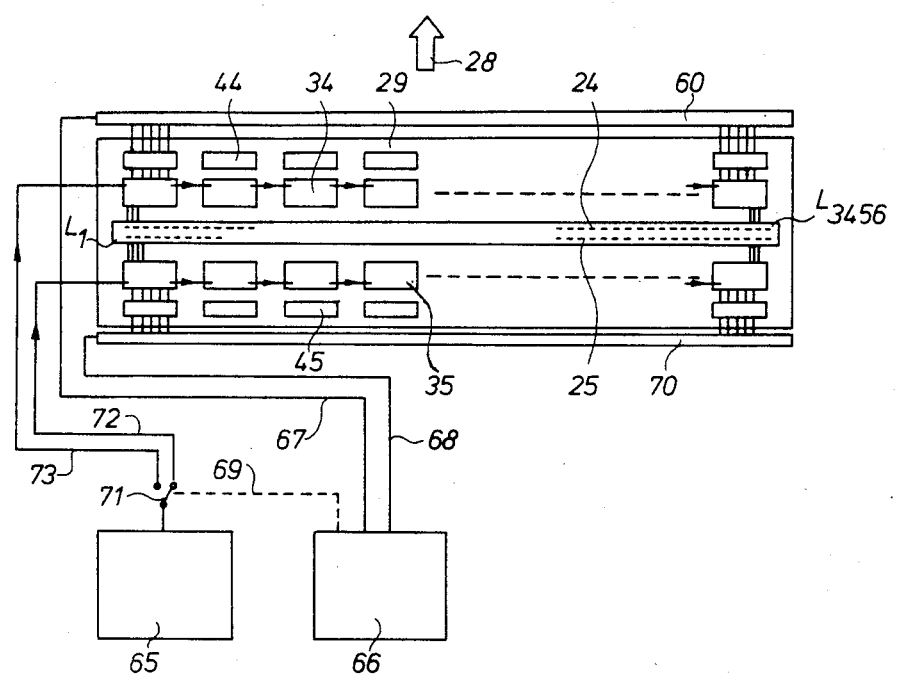
FIG. 6 is an electronic block circuit of the recording apparatus.

The electronic block circuit of the apparatus is illustrated in FIG. 6, wherein 65 is a character generator, and 66 is a control unit wherein a clock signal is produced as well as supply voltages and trigger and load signals that are fed via several conductors represented in simplified form by the lines 67 and 68 to the printed circuit strips 60 and 70 via which they are fed to the corresponding control chips 34 and 35 of the modules. The clock signal controls via a line 69 a semi-conductor switch 71 that alternately applies via the lines 72 and 73 the data signals to the row 25 of the odd and the row 24 of the even numbered LED's. In the recording head of the present example there are provided 3456 LED's, arranged in two staggered rows each of 1728 LED's.

It will be understood that in practice the apparatus will comprise many other circuits for the control of the different operations, such as setting and resetting circuits, synchronization circuits, stabilizing circuits, defect signalling circuits, etc. Such circuits are known in the art, and a description of them is not required for the understanding of the operation of the apparatus.

The generator 65 produces data signals for the recording of the first image line to be recorded on the photoreceptor. Switch 71 is controlled by the clock frequency, e.g. a frequency of the order of magnitude of 3 Mhz, such that the signal for the first image point of the first image line is put on line 72, the signal for the second image point is put on line 73, the next signal on line 72, the still next on line 73, etc., until finally 1728 distinct (odd) image points have been read-in in the shift registers 36 of the control means 35, and 1728 (even) image points have been read-in in the shift registers 36 of the control chips 34. The total number of 3456 image points is determined by the use in the recording head of twentyseven modules with 128 LED's each.

Appropriate load impulse signals are transmitted by control unit 66 via lines 67 and 68 to the input pads 54 of the control chips 34 and 35 so that the chips 35 are caused to pass their data signals in parallel directly from their shift registers 36 to their latch registers 41 so that these signals become applied to the corresponding odd LED's and the control chips 34 are instructed to pass their data signals in parallel from their shift register 36 to their first delay registers 39.

After the photoreceptor has been advanced over a distance corresponding with the thickness of a recording line (the raster line pitch), the latch registers 41 of chips 35 are reset by an appropriate signal, and data signals representing the second image line to be recorded are produced by the generator 65.

These second line signals are now read-in to the control chips 34 and 35 in the same way as the first line signals. Now another load signal is transmitted to input pads 54. The data-bit signals in GV 1251 shift registers 36 of the control chips 35 are transferred directly to their latch register 41 and cause energisation of the odd LEDs immediately their drivers are triggered. They are triggered by a signal at an instant which is dependent on photoreceptor speed fluctuations (if any) detected by a speed detector as hereinbefore referred to, in order to preserve a predetermined spacing between successive information lines as recorded on the photoreceptor. The load signal applied to the input pads 54 associated with the control chips 34 however cause the second line data-bit signals stored in the shift registers 36 of those chips to be transferred to the delay registers 39, and the signals previously stored in those registers to be transferred to the neighbouring delay registers 40. The third line data-bit image signals are then fed into the control chips by the generator 65. On production of the next load signal on the input pads 54 the odd information signals are directly recorded as for the previous lines, whereas the even signals stored in each of the registers of control chips 34 are advanced one step. The signals stored in their shift registers are transferred to their delay register 39; the signals previously stored in those registers are transferred to their delay registers 40, and the signals previously stored in those registers are transferred to their latch registers 41 and become recorded immediately the drivers of the even LEDs are triggered. They are triggered by a signal at an instant dependent on photoreceptor speed fluctuations detected by the aforementioned speed detector so as to ensure correct transverse alignment on the photoreceptor of the odd and even information signals relating to one and the same information line. The recording of the even image points belonging to a given information line is therefore delayed by two line periods (plus or minus the automatic adjustment for photoreceptor speed fluctuation) relative to the recording of the odd image points belonging to that line. This delay compensates for the distance between the two rows of LED's, which is twice the distance between successive raster lines on the photoreceptor.

The recording of the fourth and subsequent information lines is effected by continuation of the same sequence of steps.

The following data pertain to a particular embodiment of the invention as above described with reference to the drawings.

| | |
|---|---|
| Recording head: | net recording length 1: 216 mm |
| | number of LED's per row: 1728 |
| | number of LED's per mm recording length: 16 |
| | number of modules: 27 |
| | row spacing = 125 μm |
| | staggering: 62.5 μm |
| | shift registers 36, delay registers 39,40, and latch registers 41: 64 bits |
| clock frequency: | 3 Mhz |
| resistors 59: | 4 Kohm, 2 Kohm, 1 Kohm, and 0,5 Kohm arranged for trimming |
| optical transfer means 12: | a Selfoc, type SLA 20, manufactured by Nippon sheet glass Co., Ltd. |
| recording speed: | 10 cm.s$^{-1}$. |

The present invention is not limited to the above described embodiment.

Each module may comprise one large array of LED's, instead of four smaller arrays as described. The modules may also comprise parallel rows of chips each having a single row of LED's, the chips of the different rows being in staggered relation as disclosed in the EU-application 82 201 324.9 relating to a recording apparatus for linewise recording information upon a moving photoreceptor.

Each control chips may incorporate more or less than two delay registers, in dependence on the spacing between the rows of LED's.

The thick field connection structures can be omitted and te control chips can be directly connected to a printed circuit-type conductor strip such as 60 or 70, if a current level adjustment as formed by the resistors 59 is not required.

We claim:

1. A recording apparatus for linewise recording information on a moving photoreceptor, said apparatus comprising a recording head with a multiplicity of individually addressable and energisable point-like radiation sources arranged in staggered parallel rows for irradiating points across a photoreceptor during movement thereof relative to and in a direction normal to said rows and driver circuits for simultaneously energising the radiation sources of each row responsive to respective data-bit input signals serially applied to said driver circuits during an information line period, there being delay means for delaying energisation of the radiation sources of a first said row relative to the energisation of the sources of a second said row thereby to compensate for the distance between such rows, characterised in that the driver circuits for the different rows of radiation sources are provided by identical chips each of which incorporates a shift register for serially reading in data-bit signals, said drivers for said plurality of the radiation sources and said delay means located between said shift register and said drivers for holding data-bit signals transferred from said shift register for a delay period before such signals are transmitted to said drivers; each said chip is formed so that it is capable of operating in different modes in one of which said delay means is operative and in the other of which such delay means is inoperative and the mode in which it operates depends on which of different voltage input points provided on each said chip being selected for the reception of a mode control voltage; and only the chips providing the driver circuits for the radiation sources requiring the delayed energisation are connected into said mode control voltage so as to operate in the delay-operative mode.

2. A recording apparatus according to claim 1, wherein each of the chips comprises a serial-in/parallel-out shift register means, at least one parallel-transfer delay register, a parallel-transfer latch register and drivers for the associated radiation sources.

3. A recording apparatus according to claim 1 or 2, wherein the chips for each row of radiation sources are located on that side of the array of radiation sources which is nearer that row; each chip has opposed end terminals via which the chip is connected into a data-bit signal transmission line; each chip is capable of effecting data-bit signal shift along its shift register in either direction depending on which of two voltage input points provided on the chip is selected for the reception of a shift direction control voltage; and the control chips for the radiation sources of the different rows are so connected (via their said end terminals and their said voltage input point) to data-bit signal feed lines and to voltage supply means that the supply of data-bit signals to all of the chips takes place from the same end of the total array of radiation sources and the shifting of all such signals occurs in the same direction along the array.

4. A recording apparatus according to claim 3, wherein the chips are so formed that their mode control voltage input points are the same as their shift direction control voltage input points.

5. A recording apparatus according to claim 1, wherein the total array of radiation sources is formed by the end-to-end assembly of a plurality of modules each carrying a group of the radiation sources and their associated chips.

6. A recording apparatus according to claim 5, wherein each of the modules of said modular assembly includes, for said each row of radiation sources, a connector assembly via which the control chips of that row are conductively connected to each other and to voltage supply lines.

7. A recording apparatus according to claim 6, wherein each said connector assembly is provided with means permitting ready adjustment of a current level to the radiation sources supplied via that connector assembly.

* * * * *